(12) United States Patent
Ramachandran

(10) Patent No.: US 7,599,341 B2
(45) Date of Patent: Oct. 6, 2009

(54) SYSTEM AND METHOD FOR MANAGING COMMUNICATION ROUTING WITHIN A WIRELESS MULTI-HOP NETWORK

(75) Inventor: Shyamal Ramachandran, Maitland, FL (US)

(73) Assignee: Motorola, Inc., Schaumburg, IL (US)

( * ) Notice: Subject to any disclaimer, the term of this patent is extended or adjusted under 35 U.S.C. 154(b) by 598 days.

(21) Appl. No.: 11/363,616

(22) Filed: Feb. 28, 2006

(65) Prior Publication Data

US 2007/0201392 A1    Aug. 30, 2007

(51) Int. Cl.
*H04W 4/00* (2009.01)
*H04L 12/28* (2006.01)

(52) U.S. Cl. .................... 370/338; 370/351
(58) Field of Classification Search .......... 370/310, 370/338, 351, 315
See application file for complete search history.

(56) References Cited

U.S. PATENT DOCUMENTS

| | | | |
|---|---|---|---|
| 7,106,703 B1 * | 9/2006 | Belcea | 370/310 |
| 7,443,822 B2 * | 10/2008 | Lindskog et al. | 370/338 |
| 2003/0152110 A1 * | 8/2003 | Rune | 370/509 |
| 2005/0041573 A1 * | 2/2005 | Eom et al. | 370/208 |
| 2006/0046643 A1 * | 3/2006 | Izumikawa et al. | 455/7 |
| 2006/0140123 A1 * | 6/2006 | Conner et al. | 370/238 |
| 2006/0198308 A1 * | 9/2006 | Vasseur et al. | 370/238 |
| 2007/0109972 A1 * | 5/2007 | MacDonald | 370/252 |

* cited by examiner

*Primary Examiner*—Lester Kincaid
*Assistant Examiner*—Nathan Mitchell
(74) *Attorney, Agent, or Firm*—Randi L. Karpinia

(57) ABSTRACT

A system and method of operation for managing communication routing from a subscriber station to a base station is provided. The method includes establishing a communication link between the subscriber station and the base station; determining a base station signal quality and a base station timing offset from the subscriber station to the base station; receiving by the base station from one or more relay stations an associated relay station signal quality and an associated relay station timing offset from the subscriber station to the base station through each of the one or more relay stations; identifying a best communication route from the subscriber station to the base station; and transmitting from the base station to the subscriber station a timing correction value associated with the best communication route.

23 Claims, 5 Drawing Sheets

SYSTEM AND METHOD FOR MANAGING COMMUNICATION ROUTING WITHIN A WIRELESS MULTI-HOP NETWORK

FIELD OF THE INVENTION

The present invention relates generally to wireless multi-hop networks; and more particularly to managing communication routing in the presence of relay stations within a wireless multi-hop network.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

One example of an infrastructure-based wireless network is TDMA (time division multiple access) which is a technology used in digital cellular telephone communication that divides each cellular channel into time slots in order to increase the amount of data that can be carried. TDMA works by dividing a radio frequency into time slots and then allocating slots to multiple calls. In this way, a single frequency can support multiple, simultaneous data channels. TDMA is used by Digital-American Mobile Phone Service (D-AMPS), Global System for Mobile communications (GSM), and Personal Digital Cellular (PDC) systems. However, each of these systems implements TDMA in a somewhat different manner.

In TDMA networks, a node accessing an uplink channel during an allocated time slot, must offset its transmit time, such that its transmission is received by the destination at the exact slot boundary. In a cellular deployment, multiple subscriber stations access the uplink channel towards a central base station. Each subscriber station must account for its propagation delay to the base station and must offset its transmissions so that all transmissions are aligned perfectly at slot boundaries at the base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

Institute of Electrical and Electronics Engineers (IEEE) 802.16 is a group of broadband wireless communications standards for metropolitan area networks (MANs). IEEE 802.16 provides fixed point-to-multipoint broadband wireless systems which enable multimedia applications with wireless connection and, with a range of up to thirty (30) miles, provide a viable last mile technology.

An earlier group of IEEE standards, the 802.11 specifications, provide a wireless alternative to Ethernet LANs (local area networks); 802.16 standards are expected to complement these by enabling a wireless alternative to expensive T1 links connecting offices to each other and the Internet.

IEEE 802.16 is a point-to-multipoint (PMP) system with one hop links between a base station and a subscriber station. Such network topologies severely stress link budgets at the cell boundaries and often render the subscribers at the cell boundaries incapable of communicating with the higher-order modulations that their radios can support. Pockets of poor-coverage areas are created where high data-rate communication is impossible. This in turn brings down the overall system capacity. While such coverage voids can be avoided by deploying base stations tightly, this drastically increases both the capital expenditure and operational expenditure for the network deployment.

In an 802.16 deployment, multiple subscriber stations access the uplink channel towards a central base station. Each subscriber station must account for its propagation delay to the base station and must offset its transmissions so that all transmissions are aligned perfectly at slot boundaries at the base station. This procedure is carried out in IEEE 802.16 using a collection of processes called ranging. The standard also permits the adjustment of the transmit power and frequency at the subscriber station, by way of the ranging mechanism.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
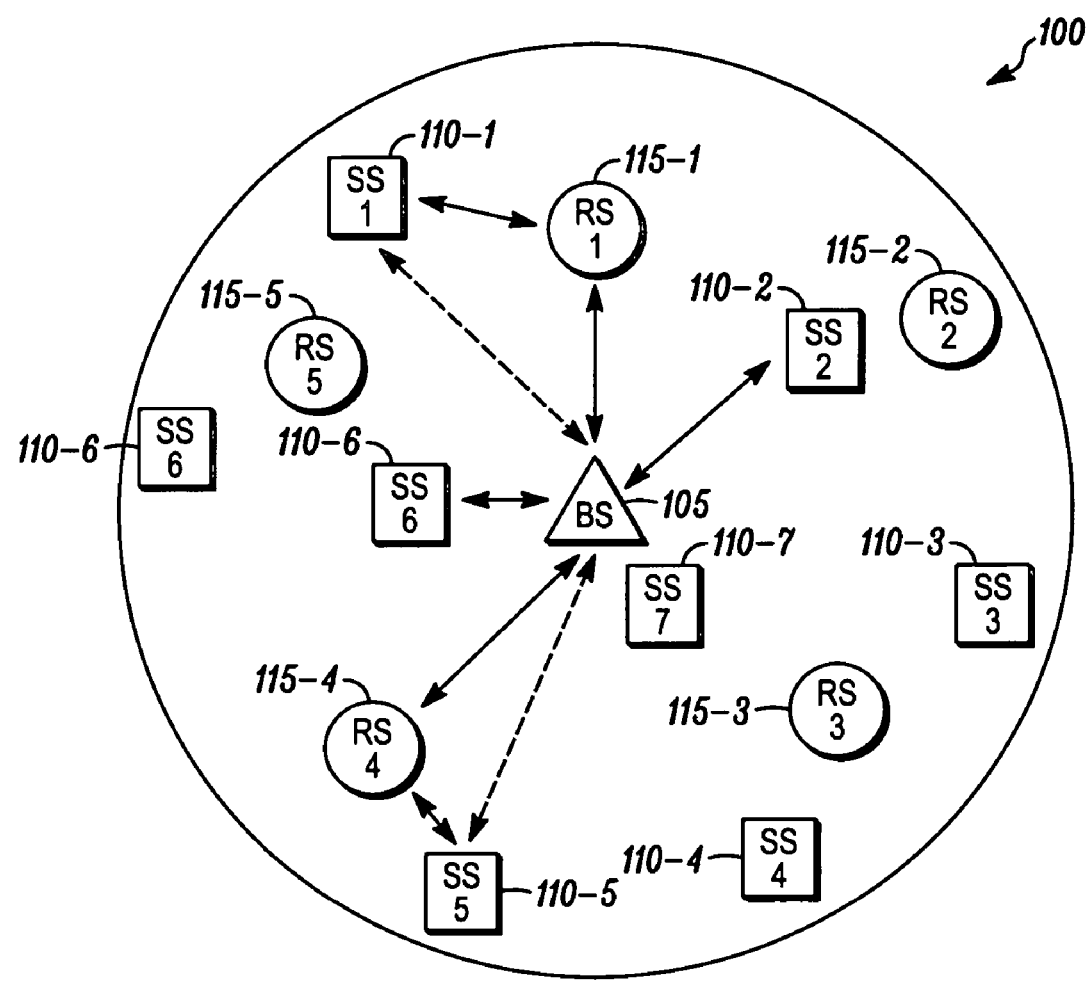
FIG. 1 illustrates an exemplary wireless communication network in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to managing communication routing in the presence of relay stations within a wireless multi-hop network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of managing communication routing in the presence of relay stations within a wireless multi-hop network described herein. The non-processor circuits may include, but are not limited to, a radio receiver, a radio transmitter, signal drivers, clock circuits, power source circuits, and user input devices. As such, these functions may be interpreted as steps of a method to perform ranging in the presence of relays within a wireless multi-hop network. Alternatively, some or all functions could be implemented by a state machine that has no stored program instructions or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A method and apparatus for managing communication routing in the presence of relay stations within a wireless multi-hop network is provided herein. The relay stations obey the base station's initial maintenance interval and listen for ranging codes. The relay stations report the Carrier to Interference-plus-Noise Ratio (CINR) and delay values to the base station if coverage requirements specified by the network planners are met. The base station compiles a table using the reports it receives from the relay stations. If the base station cannot meet the coverage and/or quality of service (QoS) requirements, it selects the best candidate relay station and informs the subscriber station of the timing offset as reported by that candidate relay station. The procedure is transparent to the subscriber station.

FIG. 1 illustrates an exemplary wireless communication network in accordance with an embodiment of the present invention. FIG. 1 specifically illustrates an 802.16 network 100. As illustrated, the network 100 includes at least one base station 105 for communication with a plurality of subscriber stations 110-$n$. The exemplary network 100 further includes a plurality of relays (repeaters) 115-$n$. The relays 115-$n$ are deployed in the areas with poor coverage and repeat transmissions so that subscriber stations 110-$n$ in a cell boundary can connect using high data rate links. In some networks, the relays 115-$n$ are simpler versions of the base station 105, in that they do not manage connections, but only assist in relaying data. Alternatively, the relays 115-$n$ can be at least as complex as the base station 105.

It will be appreciated by those of ordinary skill in the art that the introduction of relays 115-$n$ in an IEEE 802.16 network, with the intention of resolving coverage problems, will have to consider the following constraints: a) connections are created and managed by the base station 105; b) the base station 105 alone manages the relays 115-$n$, and the subscriber stations 110-$n$ are unaware of the presence of relays 115-$n$ (relaying is transparent to the subscriber stations 110-$n$).

Therefore, in a network 100 with relays 115-$n$, the base station 105 should be able to decide whether a subscriber station 110-$n$ should connect to the base station 105 directly or through a relay 115-$n$. There could be multiple relays 115-$n$ in the cell targeting multiple pockets of poor coverage. The base station 105 should be able to decide which one of the relays 115-$n$ is the best candidate to relay the subscriber station's connection. The subscriber station 110-$n$ performs ranging with the base station 105 alone, since it is unaware of the presence of the relays 115-$n$. The base station 105 must be able to seamlessly assist the subscriber station 110-$n$ with the ranging with respect to the preferred relay 115-$n$.

Description of Current Ranging Procedure

The ranging procedure described here is directly applicable to IEEE 802.16 systems employing the Orthogonal Frequency Division Multiple Access (OFDMA) physical layer (PHY) option.

OFDMA ranging is broadly classified as initial ranging and periodic ranging. Initial ranging is the procedure carried out when a subscriber station 110-$n$ enters a base station's 105 network domain for the first time as a result of initial power-up or a handoff. Periodic ranging is carried out during the normal operation in order to track the subscriber station's timing, frequency and power settings closely. For both forms of ranging, the subscriber station 110 transmits a pseudo-random (PR) code sequence on the uplink to initiate the procedure. The code sequence used is selected from separate sets or domains of orthogonal sequences allocated for the specific purpose and distributed in the cell by the base station 105.

Figure 2:
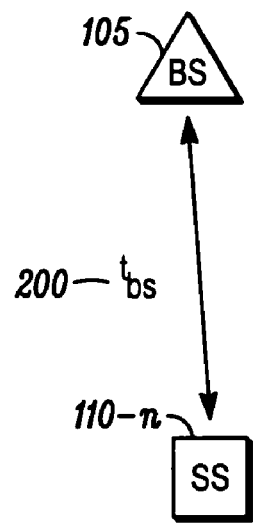
FIGS. 2 through 4 illustrate various portions of the wireless communication network of FIG. 1 in accordance with some embodiments of the present invention.

Referring to FIG. 2, in IEEE 802.16 (like TDMA) systems, the subscriber station 110-$n$ offsets its transmissions in time, to obey slot alignment at the base station 105. The subscriber station 110-$n$ and the base station 105 perform message exchange to determine the subscriber station's exact timing offset value $t_{bs}$ 200. The subscriber station 110-$n$ expects to learn $t_{bs}$ 200 from the base station 105.

Initial Ranging

The base station 105 transmits the preamble, the frame synchronization information, the Downlink Map Message DL-MAP, the Uplink Map Message (UL-MAP) and the Uplink Channel Descriptor (UCD) message in every frame. Upon power-up the subscriber station 110-$n$ receives this information and learns the PR code sequences allocated for the initial and periodic ranging procedures as well as the initial maintenance interval (symbol, slot and sub-channel) in the uplink sub-frame. The subscriber station 110-$n$ randomly selects a code from the set of codes allocated for initial ranging and transmits it on the uplink during a randomly selected time slot from within the initial maintenance interval. The subscriber station 110-$n$ makes this transmission assuming that it is co-located with the base station 105 (zero propagation delay).

When the base station 105 successfully detects the PR sequence on the uplink, it cannot determine the identity of the subscriber station 110-$n$ that attempted the ranging procedure. It therefore broadcasts on the downlink, a Ranging Response message (RNG-RSP) which includes the PR code received, and the slot number that it was received in. The RNG-RSP message also includes timing and power correction values that the subscriber station 110-$n$ should adopt before its next transmission. In addition, the base station 105 also makes an allocation in the UL-MAP message, using the CDMA_Allocation_IE (Code-Division Multiple Access Allocation Information Element), which carries the identity of the PR code and transmission opportunity used to perform ranging. This information, sent on the downlink, is sufficient for the subscriber station 110-$n$ to detect the allocation made for the purpose of continuing the ranging process. The subscriber station 110-$n$ makes the necessary timing and power corrections based on the recommendations carried in the RNG-RSP message, and uses the uplink allocation to transmit the Range Request message (RNG-REQ) to the base station 105. The RNG-REQ message carries the subscriber station's MAC address. In response, the base station 105 sends a RNG-RSP message addressed to the subscriber station 110-$n$, with additional corrections if necessary and the connection identifications (CID) for the basic and management connections between the subscriber station 110-$n$ and the base station 105. This completes the initial ranging process.

Periodic Ranging

Periodic ranging involves a procedure substantially similar to initial ranging discussed above. The base station 105 periodically (possibly in every frame) allocates an initial maintenance interval. The location and duration of the interval within the frame is disclosed using the UL-MAP message sent in the beginning of every frame. A subscriber station 110-$n$ can choose to perform ranging in this interval as often as it deems necessary.

The subscriber station 110-$n$ initiates the periodic ranging procedure by randomly selecting a PR code sequence from the set of codes allocated for this purpose, and then transmitting it in a slot randomly selected from within the initial maintenance interval. When the base station 105 successfully detects the PR sequence on the uplink, it cannot determine the identity of the subscriber station 110-$n$ that attempted the ranging procedure. It therefore broadcasts on the downlink, a RNG-RSP which includes the PR code received, and the slot number that it was received in. The RNG-RSP message also includes timing and power correction values that the subscriber station 110-$n$ should adopt before its next transmission. Since the PR code used for this process is from a different (periodic ranging) domain, the base station 105 stops the procedure here.

While the frequency of periodic ranging is controlled by the subscriber station 110-$n$, the base station 105 may send an unsolicited RNG-RSP. The subscriber station 110-$n$ should honor the adjustments recommended in the message.

Ranging in a Relay Based Multihop Network

Figure 3:
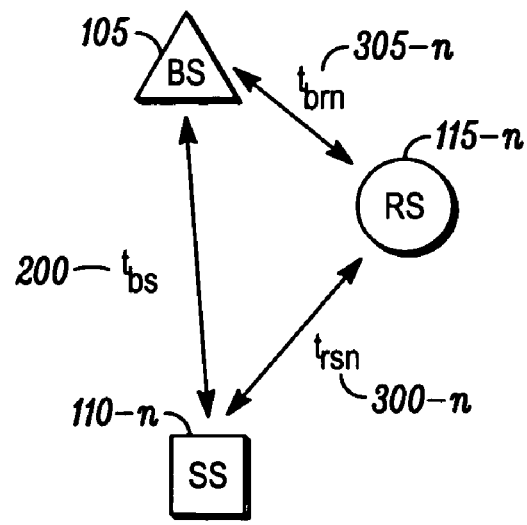

In a multihop network comprising relays 115-$n$ such as the network 100 illustrated in FIG. 1, the base station 105 still manages all the connections in the cell. This includes procedures for connection establishment, capacity request and access grants. However, the base station 105 might permit a subscriber station 110-$n$ to communicate with it, via a relay 115-$n$ as illustrated in FIG. 3.

For example, IEEE 802.16 employs Relay Stations (RS) 115-$n$ to improve link budget. A subscriber station 110-$n$ may reach the base station 105 via a relay station 115-$n$. The relay station 115-$n$ repeats transmissions for the subscriber station 110-$n$ towards the base station 105 (and vice versa). It will be appreciated by those of ordinary skill in the art that the subscriber station 110-$n$ must now offset its transmissions by a value of $t_{rsn}$ 300-$n$ from the subscriber station 110-$n$ to the relay station 115-$n$. The relay station 115-$n$ uses the timing offset $t_{brn}$ 305-$n$ from the relay station 115-$n$ to the base station 105. Control message exchange may still be with directly with the base station 105, so the base station 105 must inform the subscriber station 110-$n$ of the values of $t_{rsn}$ 300-$n$ and $t_{brn}$ 305-$n$.

Figure 4:
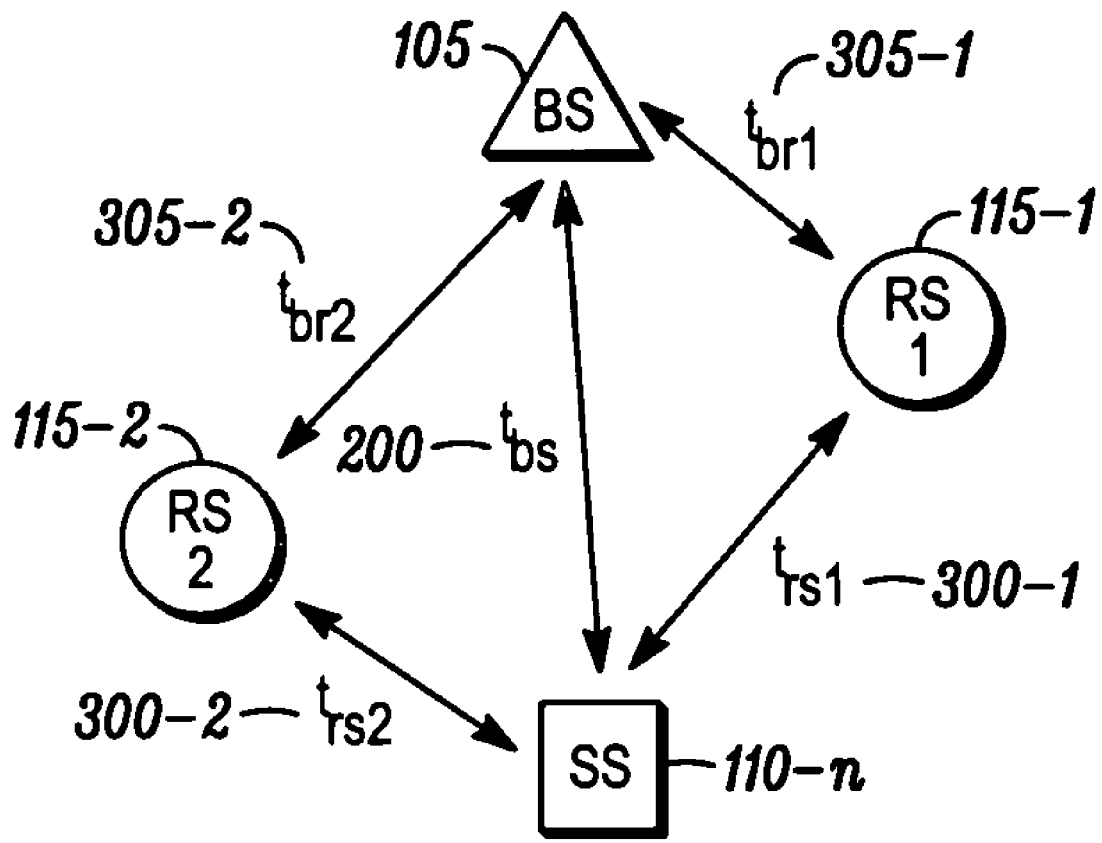

The present invention provides a system and method for efficient and accurate ranging in a relay based multihop network. Referring to FIG. 4, the present invention ensures that the subscriber station 110-$n$ is informed of the timing offset to the base station 105 and/or at least one of the relay stations 115-$n$. For example, in FIG. 4, the subscriber station 110-$n$ is informed of the timing offset $t_{bs}$ 200 to the base station 105. The subscriber station 110-$n$ is alternatively informed of the timing offset through the relay station 115-1 to the base station 105 which is equal to the timing offset $t_{rs1}$ 300-1 from the subscriber station 110-$n$ to the relay station 115-1. The subscriber station 110-$n$ is alternatively informed of the timing offset through the relay station 115-2 to the base station 105 which is equal to the timing offset $t_{rs2}$ 300-2 from the subscriber station 110-$n$ to the relay station 115-2. Since the network cell may have multiple relay stations 115-$n$, it is desirable for the subscriber station 110-$n$ to reach the base station 105 through the best relay station 115-$n$. The system and method described herein provides relay station selection and assignment transparent to the subscriber station 110-$n$. The subscriber station 110-$n$ may not even be aware of the presence of relay stations 115-$n$. This method also provides "knobs" to tune the coverage range between the relay stations 115-$n$ and the base station 105, by assigning subscriber stations 110-$n$ selectively.

The frame structure can take various forms and will not impact this method. In general, the base station 105 allocates some time in both the uplink and the downlink subframe for the relays 115-$n$ to communicate to the base station 105 or other subscriber stations 110-$n$. In each frame the relays 115-$n$ accumulate capacity requests from the subscriber stations 110-$n$ and forward them to the base station 105. The base station 105 makes a grant to each relay 115-$n$ for the aggregate capacity request. The relays 115-$n$ then sub-divide the allocated capacity among the subscriber stations 110-$n$ that requested access.

The base station 105 allocates regions in the uplink exclusively for use by relays 115-$n$ to be able to report the signal quality and timing offset of the subscriber stations 110-$n$ in their neighborhood. This uplink period could be contention access period where the different relay stations 115-$n$ contend for access using the contention access mechanisms as understood by those of ordinary skill in the art. In another embodiment, the base station 105 allocates a specific periods for specific relay stations 115-$n$ to uplink their reports.

Initial Ranging

Figure 5:
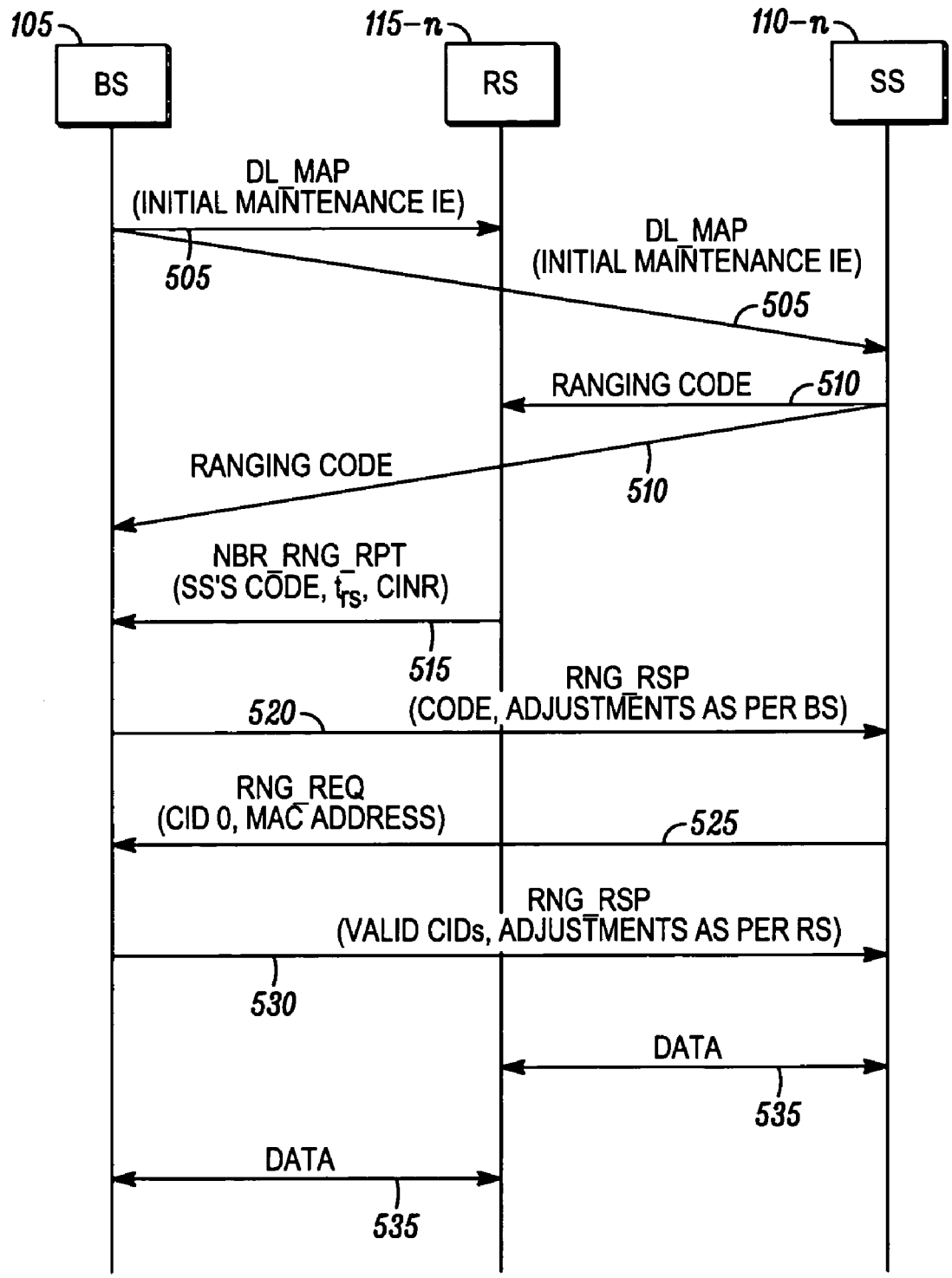
FIG. 5 is an exemplary message flow diagram for use within the wireless communication network of FIG. 1 in accordance with some embodiments of the present invention.

FIG. 5 illustrates a message flow diagram of some embodiments of the present invention and will be utilized in the operation description described following herein.

Subscriber stations 110-n perform initial ranging with the base station 105 using the usual procedure. They transmit a PR code randomly selected from the initial ranging domain, in a randomly selected ranging slot (OFDMA symbol number, sub-channel, etc.) from within the initial maintenance region. Since the initial maintenance interval is announced in the UL-MAP broadcast by the base station 105, the relay stations 115-n in the cell are also aware of this allocation and the time of its occurrence.

During the initial maintenance interval allocated by the base station 105, all the relay stations 115-n and the base station 105 attempt to detect the PR code sequence transmitted by the subscriber station 110-n, and estimate the CINR from the detected output. Additionally each relay station 115-n and the base station 105 computes the propagation delay between the subscriber station 110-n and itself. In FIGS. 2 and 3, these are $t_{rs}$ and $t_{bs}$ respectively. As mentioned before, the subscriber station 110-n transmits the PR code 510 assuming that it is co-located with the base station 105. Since the relay station 115-n has already performed ranging and is aware of its own timing offset value ($t_{br}$) to the base station 105, and it knows from the DL-MAP the timing of the initial maintenance interval, it can determine the propagation delay between the subscriber station 110-n and itself.

At each relay station 115-n, if the measured CINR is greater than RS_ACCEPT_CINR, the relay station 115-n includes the PR code, the power adjustment, the measured CINR and the timing offset for the subscriber station 110-n, in its neighborhood ranging report (NBR-RNG-RPT) 515, and transmits it to the base station 105. It will be appreciated by those of ordinary skill in the art that RS_ACCEPT_CINR can be preprogrammed within a relay station 115-n, or can be delivered to the relay station 115-n over the network management plane. In accordance with the present invention, the RS_ACCEPT_CINR value can be used by the network operator to control the footprint of the relay station 115-n. The base station 105 also calculates the power adjustment and timing offset to the subscriber station 110-n and compiles a locally maintained table.

Figure 6:
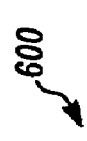
FIG. 6 is an exemplary table of communication information stored within a base station of the wireless communication network of FIG. 1 in accordance with some embodiments of the present invention.

FIG. 6 illustrates an exemplary table 600 which can be stored within the base station 105 in accordance with some embodiments of the present invention. It will be appreciated by those of ordinary skill in the art that the table 600 is cleared and updated with the latest measurements after every initial maintenance interval. As illustrated, for each PR code 605, the base station 105 stores an associated relay station identification 610, a CINR 615, a power adjust 620, and a timing offset 625. It will be appreciated by those of ordinary skill in the art that the relay station identification 610 can be an ID of the relay station 115-n, or alternatively an ID of the connection between the relay station 115-n and the base station 105.

The base station 105 schedules uplink time for the subscriber station 110-n to receive connection identifications (CIDs) and complete the ranging process. Upon compiling the table 600, for each PR code 605, the base station 105 compares the CINR 615 it measured, with the minimum required CINR for the highest order uplink interval usage code (UIUC) that it supports. If the CINR 615 measured by the base station 105 is above the threshold, the base station 105 responds to the PR code by transmitting a RNG-RSP 520 with the power adjustment and timing offset as per its own measurements. The subscriber station 110-n that initiated the ranging identifies the RNG-RSP as meant for itself since it carries the PR code and the ranging slot information. The subscriber station 110-n applies the recommended transmit parameter adjustments. The rest of the ranging and connection establishment process is carried out as usual, since this subscriber station 110-n will directly connect to the base station 105.

If the CINR 615 measured by the base station 105 is below the threshold, the base station 105 selects the relay station 115-n with the highest measured CINR 615 for the PR code 605. The base station 105 assigns the subscriber station 110-n to the selected relay station 115-n and establishes a multihop connection to it. There are two methods that the base station 105 can adopt.

In one method, the base station 105 responds to the PR code by transmitting a RNG-RSP 520 with the power adjustment and timing offset as per its own measurements. The subscriber station 110-n that initiated the ranging identifies the RNG-RSP as meant for itself since it carries the PR code and the ranging slot information. The subscriber station 110-n applies the recommended transmit parameter adjustments. The base station 105 broadcasts the UL-MAP with a CDMA_Allocation_IE. Since the CDMA_Allocation_IE carries the information about the PR code and the slot used for initial ranging, the subscriber station 110-n that initiated the process is able to identify it. The subscriber station 110-n transmits a RNG-REQ 525 with the CID "0" and its MAC address. The base station 105 responds by transmitting a RNG-RSP message 530 with the basic and the management CIDs. In this RNG-RSP message 530, the base station 105 includes the transmit power adjustment and the timing offset as per the measurement reported by the selected relay station 115-n.

In another method, the base station 105 responds to the PR code by transmitting a RNG-RSP 520 with the transmit power adjustment and timing offset as per the selected relay station's measurements. The subscriber station 110-n that initiated the ranging identifies the RNG-RSP 520 as meant for itself since it carries the PR code and the ranging slot information. The subscriber station 110-n applies the recommended transmit parameter adjustments. The base station 105 then allocates an uplink transmit opportunity for the subscriber station 105 using a CDMA_Allocation_IE, and informs the selected relay station 115-n of the allocation. The relay station 115-n rebroadcasts the allocation, along with other allocations that it might have to relay. Since the CDMA_Allocation_IE carries the information about the PR code and the slot used for initial ranging, the subscriber station 110-n that initiated the process is able to identify it. The subscriber station 110-n transmits a RNG-REQ 525 with the CID "0" and its MAC address. The relay station 115-n receives it since the subscriber station's transmit parameters are set according to the measurements at the relay station 115-n. The relay station 115-n forwards the RNG-REQ 525 to the base station 105 during its own uplink transmit opportunity. The base station 105 responds to the relay station 115-n with the basic and management CIDs. The relay station 115-n transmits a RNG-RSP message 530 with the CIDs and the appropriate corrections as needed.

When the base station makes an allocation for the subscriber station using the CDMA_Allocation_IE, it retains in memory the allocation time and the PR code in response to which the allocation was made. When the ranging process continues using a certain allocation, the base station learns the MAC address and associates the assigned CID with the measurements made on the PR code. This facilitates the distinction between different subscriber stations when more that one subscriber station attempt to perform ranging in one initial maintenance interval.

When the base station has assigned a subscriber station to relay station, using either of the above mentioned methods, the base station, in one embodiment notifies the assigned relay station of this assignment by sending the relay station a message on the downlink containing the CID assigned to the subscriber station and the time offset assigned to it.

Periodic Ranging

If the subscriber station 110-$n$ wishes to perform periodic ranging, it randomly selects a PR code from the periodic ranging domain and transmits it during the initial maintenance interval. Like in the case of initial ranging, the base station 105 and the relay stations 115-$n$ detect the PR code and note the CINR and timing adjustments. At each relay station 115-$n$, if the measured CINR is greater than RS_ACCEPT_CINR, the relay station 115-$n$ transmits the PR code, the power adjustment, the measured CINR and the timing offset for the subscriber station 110-$n$ to the base station 105 in its neighborhood ranging report (NBR-RNG-RPT) 515. The base station 105 compiles a table similar to table 600 of FIG. 6. The base station 105 then determines the node that measured the highest CINR for the code. The base station 105 responds to the subscriber station 110-$n$ with a RNG-RSP 520 including that node's measured power adjustment and timing correction values. The subscriber station 110-$n$ that initiated the ranging identifies the RNG-RSP 520 as meant for itself since it carries the PR code and the ranging slot information. The subscriber station 110-$n$ applies the recommended transmit parameter adjustments.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for managing communication routing from a subscriber station to a base station within a wireless multi-hop network having one or more relay stations, the method comprising:

establishing a communication link between the subscriber station and the base station;

determining a base station signal quality and a base station timing offset from the subscriber station to the base station;

receiving by the base station from each of the one or more relay stations an associated relay station signal quality and an associated relay station timing offset from the subscriber station to the base station through each of the one or more relay stations;

identifying by the base station a best communication route from the subscriber station to the base station using the base station signal quality, the base station timing offset, each of the associated relay station signal qualities, and each of the associate relay station timing offsets; and transmitting from the base station to the subscriber station a timing correction value associated with the identified best communication route.

2. A method as claimed in claim 1, further comprising:
transmitting from the base station to the relay station associated with the best communication route a route assignment message including an identification of the subscriber station and the timing correction value.

3. A method as claimed in claim 1, wherein transmitting the timing correction value to the subscriber station further comprises transmitting from the base station to the subscriber station a power correction value associated with the identified best communication route.

4. A method as claimed in claim 3, further comprising:
transmitting data from the subscriber station to the base station using the timing correction value and the power correction value.

5. The method as claimed in claim 4, wherein transmitting the data using the timing correction value and the power correction value comprises transmitting the data through the relay station associated with the best communication route.

6. The method as claimed in claim 1, wherein the wireless multi-hop network is an 802.16 network.

7. A method as claimed in claim 1, wherein each of the base station signal quality and relay station signal quality comprises a Carrier to Interference-plus-Noise Ratio (CINR).

8. A method as claimed in claim 1, further comprising:
establishing a maintenance interval after transmitting the timing correction value to the subscriber station;
within each of the one or more relay stations, during the maintenance interval:
receiving one or more Pseudo Random PR) codes from the subscriber station,
measuring a relay station Carrier to Interference-plus-Noise Ratio (CINR),
measuring a relay station timing offset, and
transmitting the PR codes, the relay station CINR, and the relay station timing offset to the base station; and
repeating receiving the associated relay station signal quality and the associated relay station timing offset, identifying the best communication route, and transmitting the timing correction value to the subscriber station at the base station after the maintenance interval.

9. A method as claimed in claim 8, further comprising within each of the one or more relay stations:
determining if the measured CINR≧RS_ACCEPT_CINR, and
including the PR code, the CINR, the power adjustment, and the timing offset in a Neighborhood Ranging Report (NBR-RNG-RPT) message that it transmits to the base station after the maintenance interval.

10. A method as claimed in claim 9, further comprising:
preprogramming a value for RS_ACCEPT_CINR by each of the one or more relay stations nor to determining whether the measured CINR≧RS_ACCEPT_CINR.

11. A method as claimed in claim 9, further comprising:
delivering a value for RS_ACCEPT_CINR to each of the one or more relay stations over a network management plane prior to determining whether the measured CINR≧RS_ACCEPT_CINR.

12. A method as claimed in claim 9, wherein the base station creates and stores a table of the information it received in the various NBR-RNG-RPT messages and its own measurements prior to identifying the best communication route for use in identifying the best communication route.

13. A method as claimed in claim 12, wherein identifying the best communication route comprises:
  comparing within the base station the CINR it measured on the PR code, with the minimum CINR required to support the highest order Uplink Interval Usage Code (UIUC); and
  when the requirement is less than or equal to the measured CINR, identifying the best communication route as the direct route from the subscriber station to the base station.

14. A method as claimed in claim 12, wherein identifying the best communication route comprises:
  comparing within the base station the CINR it measured on the PR code, with the minimum CINR required to support the highest order UIUC; and
  when the CINR requirement is greater that what the base station measured, identifying the best communication route as that with the highest CINR.

15. A wireless multi-hop network comprising:
  a base station;
  a subscriber station communicatively coupled to the base station through a communication link having a signal quality and a timing offset; and
  one or more relay stations communicatively coupled between the subscriber station and the base station through each of a relay station communication link having an associated relay station signal quality and an associated relay station timing offset,
  the base station operated to:
    identify a best communication route from the subscriber station to the base station using the signal quality, the timing offset, each of the associated relay station signal qualities, and each of the associate relay station timing offsets; and
    transmit from the base station to the subscriber station a timing correction value associated with the identified best communication route.

16. A wireless multi-hop network as claimed in claim 15, wherein the base station is further operated to transmit to the relay station associated with the best communication route a route assignment message including an identification of the subscriber station and the timing correction value.

17. A wireless multi-hop network as claimed in claim 15 wherein the base station is further operated to transmit a power correction value associated with the identified best communication route.

18. A wireless multi-hop network as claimed in claim 15, wherein the subscriber station is operated to transmit data to the base station using the timing correction value and the power correction value.

19. A wireless multi-hop network as claimed in claim 18, wherein the subscriber station is operated to transmit data through the relay station associated with the best communication route.

20. A wireless multi-hop network as claimed in claim 15 comprising an 802.16 network.

21. A wireless multi-hop network as claimed in claim 15, wherein each of the base station signal quality and relay station signal quality comprises a Carrier to Interference-plus-Noise Ratio (CINR).

22. A wireless multi-hop network as claimed in claim 15, wherein the base station includes a memory for storing a table of information comprising for the base station and each of the one or more relay stations, a pseudo random code, an identification, a CINR, a power adjust, and a timing offset, for use in identifying the best communication route.

23. A method for performing at least one of an initial ranging and a periodic ranging, the method comprising:
  establishing a communication link between a subscriber station and a base station;
  determining a base station signal quality and a base station timing offset from the subscriber station to the base station;
  transmitting from the base station to one or more relay stations, pseudo random codes to be used for at least one of the initial ranging and the periodic ranging
  receiving by the base station from each of the one or more relay stations an associated relay station signal quality and an associated relay station timing offset from the subscriber station to the base station through each of the one or more relay stations;
  identifying by the base station a best communication route from the subscriber station to the base station using the base station signal quality, the base station timing offset, each of the associated relay station signal qualities, and each of the associate relay station timing offsets; and
  transmitting from the base station to the subscriber station a timing correction value associated with the identified best communication route.

* * * * *

UNITED STATES PATENT AND TRADEMARK OFFICE
CERTIFICATE OF CORRECTION

| | | |
|---|---|---|
| PATENT NO. | : 7,599,341 B2 | Page 1 of 1 |
| APPLICATION NO. | : 11/363616 | |
| DATED | : October 6, 2009 | |
| INVENTOR(S) | : Ramachandran | |

It is certified that error appears in the above-identified patent and that said Letters Patent is hereby corrected as shown below:

IN THE CLAIMS

In Column 10, Line 33, in Claim 8, delete "PR)" and insert -- (PR) --, therefor.

In Column 10, Line 56, in Claim 10, delete "nor" and insert -- prior --, therefor.

Signed and Sealed this

Thirteenth Day of September, 2011

David J. Kappos
*Director of the United States Patent and Trademark Office*